(12) United States Patent
Watanabe et al.

(10) Patent No.: US 7,261,974 B2
(45) Date of Patent: Aug. 28, 2007

(54) BATTERY-DRIVEN POWER SOURCE APPARATUS

(75) Inventors: Kenji Watanabe, Wako (JP); Noboru Sato, Wako (JP); Junichi Kikuchi, Wako (JP); Atsuhiro Naganuma, Wako (JP); Satoyoshi Ohya, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 356 days.

(21) Appl. No.: 10/493,055

(22) PCT Filed: Oct. 23, 2002

(86) PCT No.: PCT/JP02/11010
§ 371 (c)(1),
(2), (4) Date: Nov. 12, 2004

(87) PCT Pub. No.: WO03/038941
PCT Pub. Date: May 8, 2003

(65) Prior Publication Data
US 2005/0064280 A1    Mar. 24, 2005

(30) Foreign Application Priority Data
Nov. 1, 2001  (JP) ............................ 2001-336825
Dec. 25, 2001 (JP) ............................ 2001-391188

(51) Int. Cl.
*H01M 10/50* (2006.01)
(52) U.S. Cl. .................. 429/120; 429/163; 429/176
(58) Field of Classification Search ................ 429/163, 429/164, 176, 177, 186, 148, 149, 120, 156, 429/157
See application file for complete search history.

(56) References Cited
U.S. PATENT DOCUMENTS
5,866,276 A    2/1999 Ogami et al.
FOREIGN PATENT DOCUMENTS
EP    1 026 770   *  8/2000

| EP | 1 026 770 A1 | 8/2000 |
| EP | 1 047 138 A | 10/2000 |
| EP | 1 115 172 A1 | 7/2001 |
| EP | 1 139 483 A | 10/2001 |
| JP | 10-255859 | 9/1998 |
| JP | 10-270095 | 10/1998 |

* cited by examiner

Primary Examiner—Patrick Joseph Ryan
Assistant Examiner—Monique Wills
(74) Attorney, Agent, or Firm—Arent Fox LLP

(57) ABSTRACT

A battery power supply system (1) for suppressing the overall temperature variation of a plurality of battery module groups ($6_1$ to $6_5$) includes a box (2) having a cooling air inlet (3) on one end face and a suction fan (4) within a section at the other end, and a battery assembly (5) installed in an intermediate section within the box (2). The battery assembly (5) includes a plurality of battery module groups ($6_1$ to $6_5$). Each of the battery module groups ($6_1$ to $6_5$) includes a plurality of rod-shaped battery modules (7). When a gap between outer peripheral faces of two adjacent rod-shaped battery modules (7) of the first battery module group ($6_1$), which is closest to the cooling air inlet (3), is a, and a gap between the outer peripheral face of the rod-shaped battery modules (7) of the first battery module group ($6_1$) and the outer peripheral face of the adjacent rod-shaped battery modules (7) of the second battery module group ($6_2$) is b, the ratio a/b of the gaps a and b is set so that $1.0 < a/b \leq 2.0$.

6 Claims, 17 Drawing Sheets

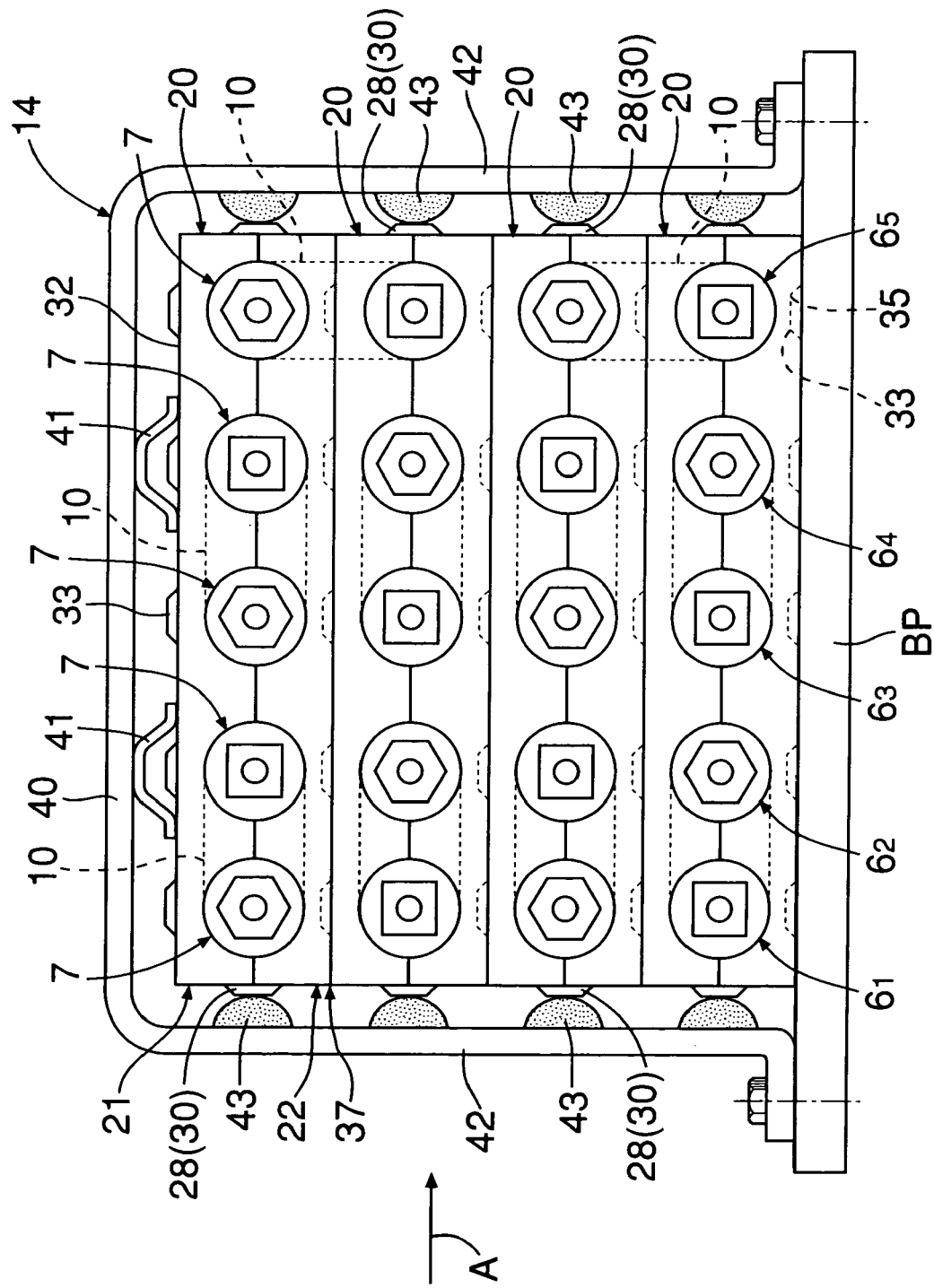

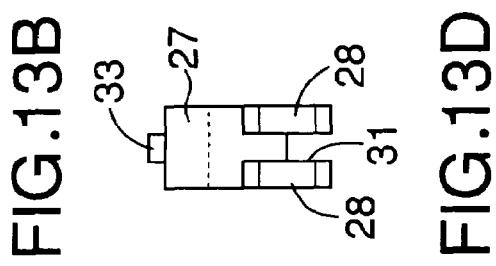
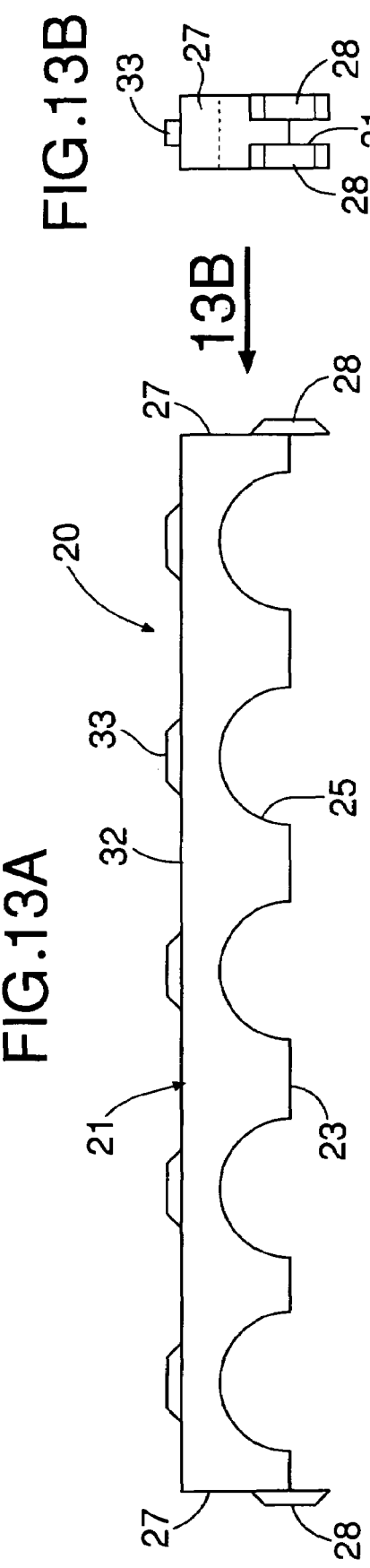
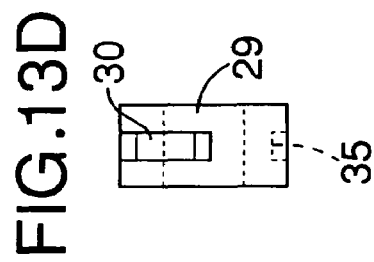
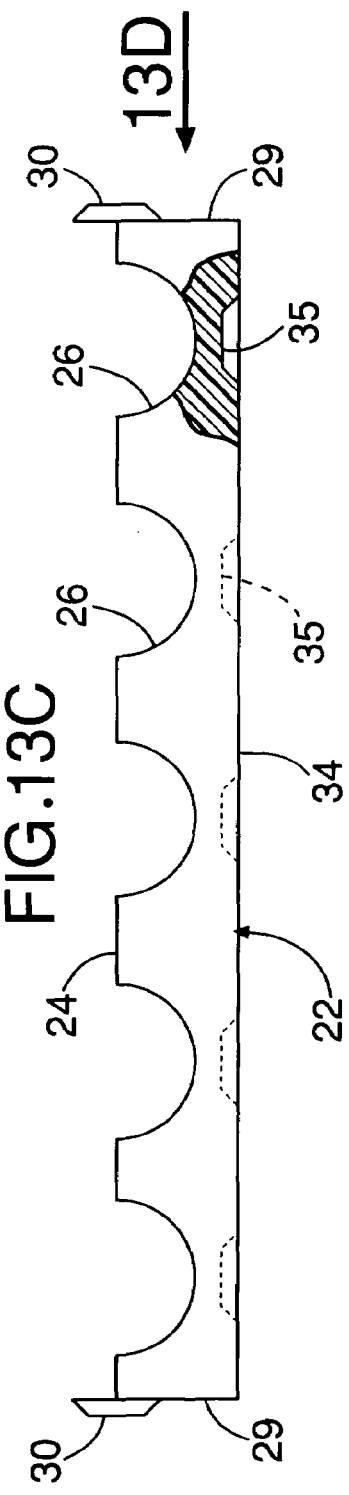

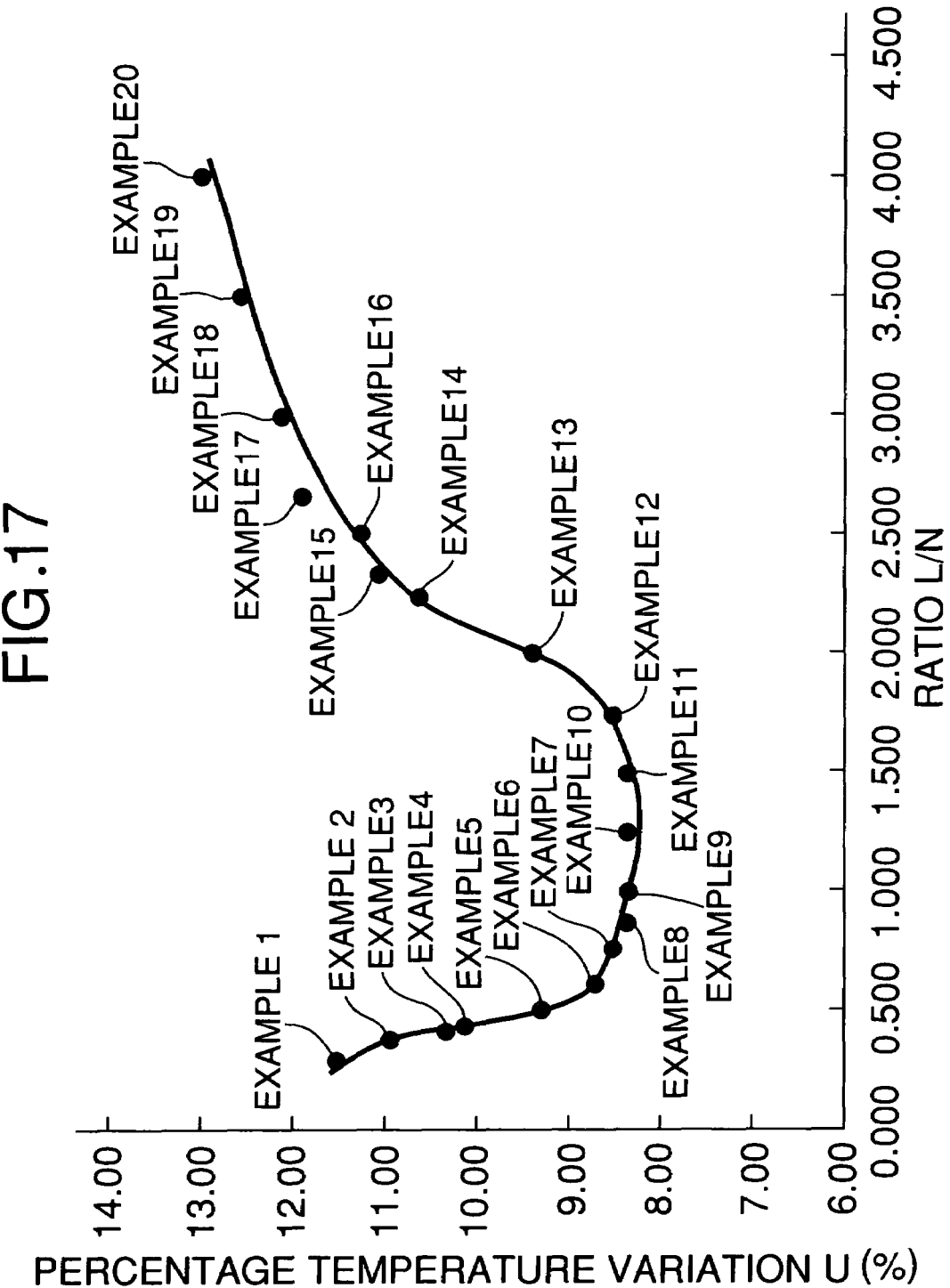

BATTERY-DRIVEN POWER SOURCE APPARATUS

CROSS-REFERENCE TO RELATED APPLICATION

This application is a National Stage entry of International Application Number PCT/JP02/11010, filed Oct. 23, 2002. The disclosure of the prior application is hereby incorporated herein in its entirety by reference.

FIELD OF THE INVENTION

The present invention relates to a battery power supply system and, in particular, one that includes a battery assembly and is mounted as a power source in a battery car, a hybrid car, a fuel cell car, etc. The battery concept referred to here includes those with various types of storage functions such as high capacity electric double-layer capacitors as well as primary batteries and secondary batteries.

BACKGROUND ART

As this type of battery power supply system there is a conventionally known arrangement that includes a box having a cooling air inlet on one end face and a suction fan within a section at the other end, and a battery assembly housed within the box. The battery assembly is formed from a plurality of battery module groups that are arranged at intervals in parallel to each other along a cooling air flow direction; each battery module group is formed from a plurality of rod-shaped battery modules that are arranged, within an imaginary plane intersecting the cooling air flow direction, at equal intervals with their axes intersecting the cooling air flow direction, and the axes of one rod-shaped battery module and another rod-shaped battery module that is adjacent thereto in the cooling air flow direction are positioned within an imaginary plane that is parallel to the cooling air flow direction.

In this case, with regard to each battery module group, the module group that is closest to the cooling air inlet is cooled best, but the extent of cooling of the battery module groups decreases the further away they are from the cooling air inlet, while also depending on the positional arrangement, and the overall temperature variation across the battery module groups is large.

In order to improve the durability of the battery module groups by cooling them uniformly, certain cooling measures have been taken. For example, one measure that has been taken is to place synthetic resin rectifying plates in spaces surrounded by four battery module groups, thus appropriately controlling the flow rate of the cooling air in the vicinity of the battery modules and thereby suppressing the temperature variation (e.g., Japanese Patent Application Laid-open No. 10-255859).

However, this conventional arrangement has the problems that, since a rectifying plate manufactured with high dimensional precision is required, the cost of a mold therefore is high, and in the initial stages of cooling the rectifying plate must be cooled at the same time, which is wasteful; furthermore, since the cooling air passage is narrowed by the rectifying plate, dirt and dust easily collect in the passage and there is also a possibility that a short circuit might be caused when condensation, etc. occurs and, moreover, since the cooling air passage is a long, narrow passage, the overall pressure loss across the box is high, and a high output suction fan is required.

DISCLOSURE OF THE INVENTION

An object of the present invention is to provide a battery power supply system that can suppress the overall temperature variation across the battery module groups by simple means such as changing the manner in which the battery module groups are arranged.

In order to achieve this object, in accordance with the present invention, there is provided a battery power supply system that includes a box having a cooling air inlet on one end face and a suction fan within a section at the other end, and a battery assembly installed in an intermediate section within the box, the battery assembly including a plurality of battery module groups arranged at intervals in parallel to each other along a cooling air flow direction, each of the battery module groups including a plurality of rod-shaped battery modules arranged, within an imaginary plane intersecting the cooling air flow direction, at equal intervals with the axes thereof intersecting the cooling air flow direction, and one rod-shaped battery module and another rod-shaped battery module that is adjacent thereto in the cooling air flow direction having their axes positioned within an imaginary plane that is parallel to the cooling air flow direction, characterized in that when a gap between outer peripheral faces of two adjacent rod-shaped battery modules of the first battery module group, which is closest to the cooling air inlet, is a, and a gap between the outer peripheral face of the rod-shaped battery modules of the first battery module group and the outer peripheral face of the adjacent rod-shaped battery modules of the second battery module group is b, the ratio a/b of the gaps a and b is set so that $1.0 < a/b \leq 2.0$.

In accordance with this arrangement, the cooling air, which has been introduced from between two adjacent rod-shaped battery modules of the first battery module group, has its entry between the rod-shaped battery modules of the first battery module group and the adjacent rod-shaped battery modules of the second battery module group suppressed, and the cooling air instead flows straight on. Although this reduces the extent of cooling of the first and second battery module groups, the cooling air, whose temperature increase has as a result been suppressed, can increase the extent of cooling of third and subsequent battery module groups, thereby suppressing the overall temperature variation of the battery module groups. Furthermore, since no rectifying plate is used and the pressure loss of the cooling air passing through the box is small, the suction fan can have a small size, thus reducing the cost of the battery power supply system. In this way, all of the above-mentioned defects of the conventional arrangements can be eliminated.

When the above-mentioned ratio a/b is $\leq 1.0$, the above-mentioned effects cannot be obtained, and when a/b>2.0 there are the following problems. That is, if the gap a is too large, the dimensions of the battery power supply system itself increase, and it is not suitable for mounting in a battery car, etc. On the other hand, if the gap b is too small, the first and second battery module groups are too close to each other, the areas of the outer peripheral faces that are exposed to the cooling air are more limited, the extent of the cooling thereof is decreased, and the overall temperature variation of the battery module groups cannot be suppressed.

Another object of the present invention is to provide a battery power supply system that can greatly suppress the overall temperature variation of the battery module groups by adding a new restriction requirement to the structural arrangement of the rod-shaped battery modules.

In order to attain this object, in accordance with the present invention, there is provided a battery power supply system that includes a box having a cooling air inlet on one end face and a suction fan within a section at the other end, and a battery assembly installed in an intermediate section within the box, the battery assembly including a plurality of battery module groups arranged at intervals in parallel to each other along a cooling air flow direction, each of the battery module groups including a plurality of rod-shaped battery modules arranged, within an imaginary plane intersecting the cooling air flow direction, at equal intervals with the axes thereof intersecting the cooling air flow direction, one rod-shaped battery module and another rod-shaped battery module that is adjacent thereto in the cooling air flow direction having their axes positioned within an imaginary plane that is parallel to the cooling air flow direction, and when a gap between outer peripheral faces of two adjacent rod-shaped battery modules of the first battery module group, which is closest to the cooling air inlet, is a, and a gap between the outer peripheral face of the rod-shaped battery modules of the first battery module group and the outer peripheral face of the adjacent rod-shaped battery modules of the second battery module group is b, the ratio a/b of the gaps a and b being set so that a>b, characterized in that when the number of the imaginary planes that intersect the cooling air flow direction is L, and the number of the imaginary planes that are parallel to the cooling air flow direction is N, the ratio L/N of L to N is such that $0.5 \leq L/N \leq 2.0$.

In accordance with this arrangement, the suppression of preferential cooling of the first and second rod-shaped battery module groups by setting a>b can be further promoted, thereby reducing the overall temperature variation of the battery module groups. However, when L/N is<0.5 or>2.0, the temperature variation increases. The ratio L/N is preferably $0.5<L/N<2.0$.

BRIEF DESCRIPTION OF THE DRAWINGS

FIG. 12 is a side view of a battery assembly;

FIG. 13A is a side view of a first half of a grommet;

FIG. 13B is a view from arrow 13B in FIG. 13A;

FIG. 13C is a side view of a second half of the grommet;

FIG. 13D is a view from arrow 13D in FIG. 13C;

FIG. 17 is a graph showing the relationship between the ratio L/N and the percentage temperature variation U.

BEST MODE FOR CARRYING OUT THE INVENTION

Embodiment I

Figure 1:
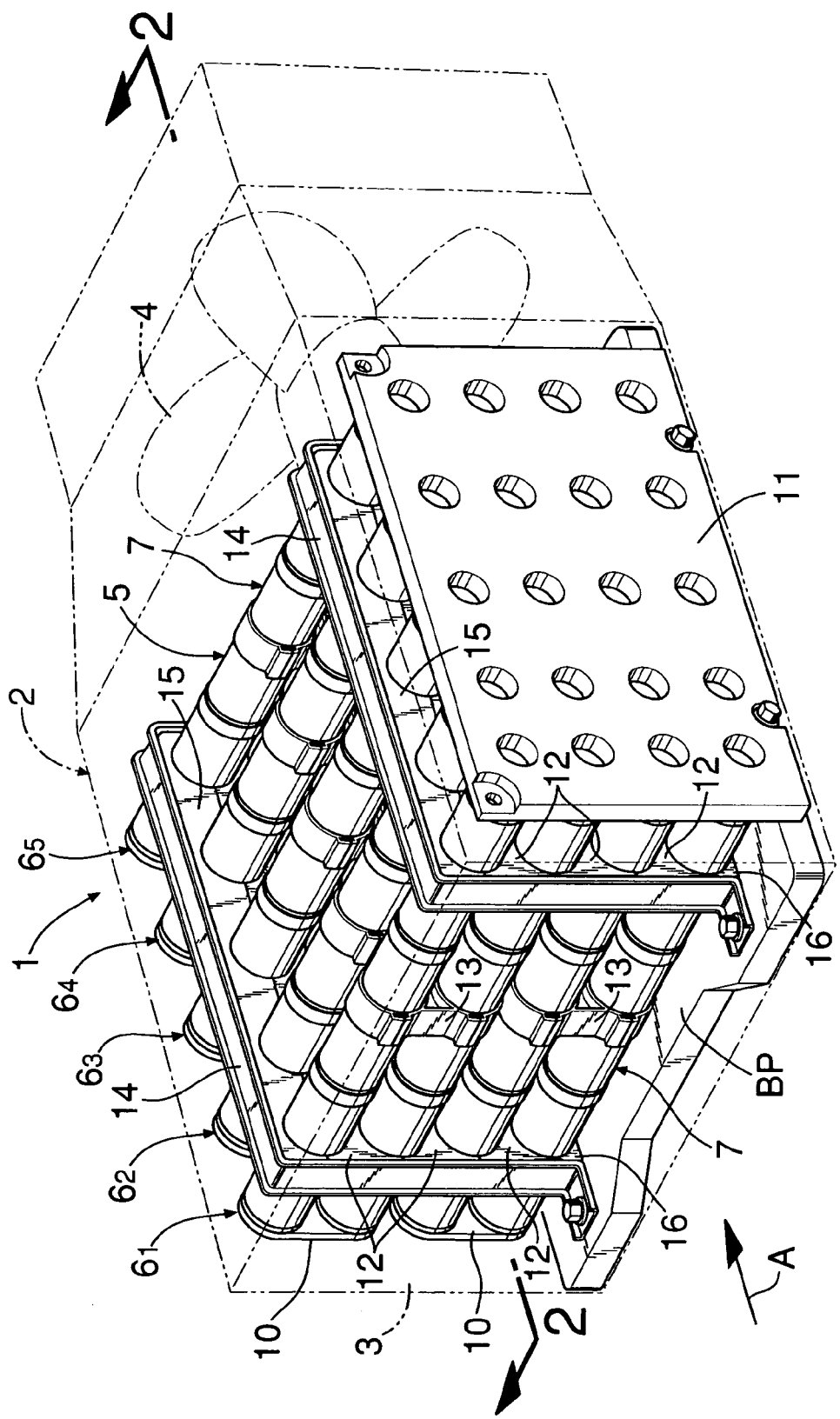
FIG. 1 is a perspective view of a battery power supply system.
Figure 2:
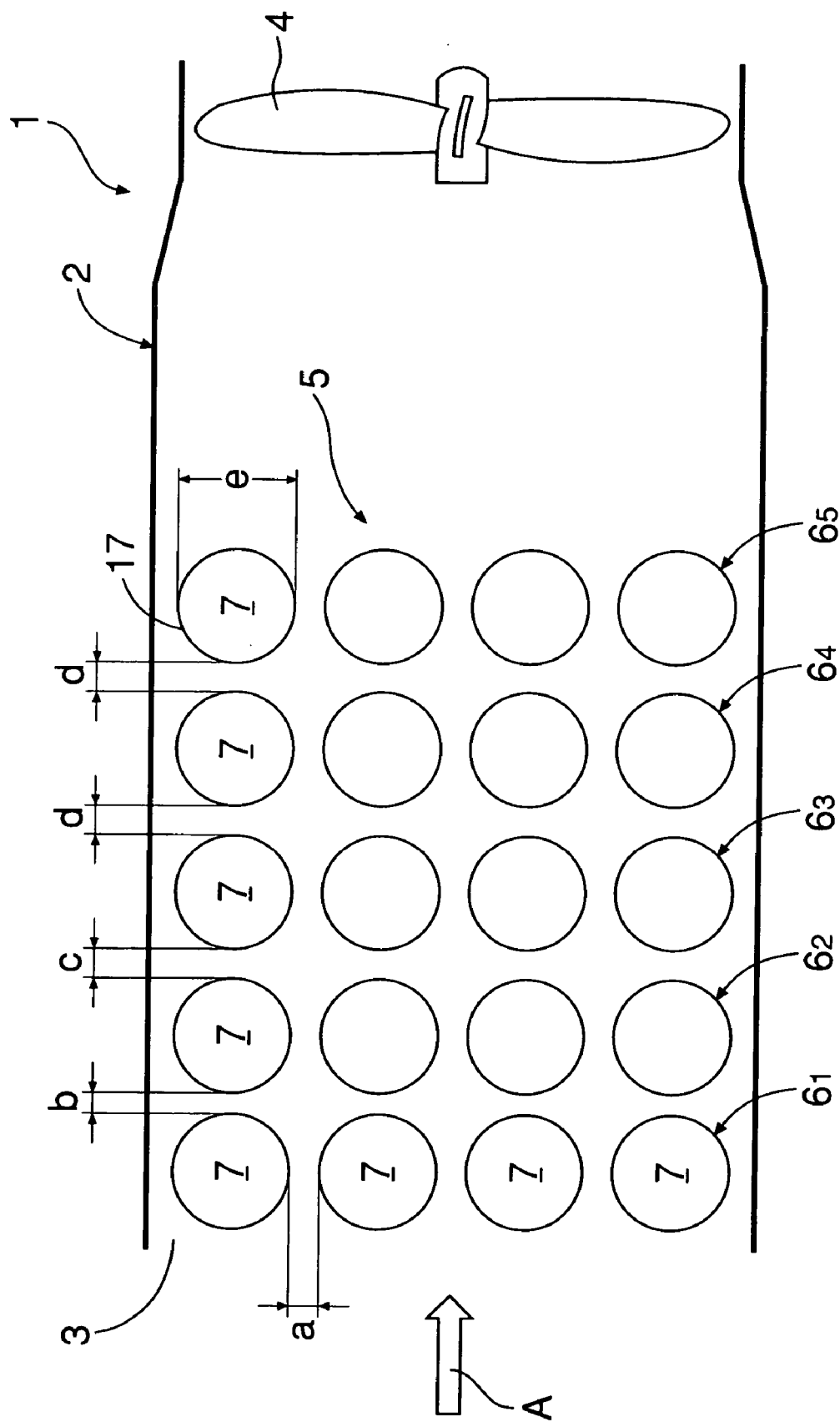
FIG. 2 corresponds to a sectional view along line 2-2 in FIG. 1 and shows a first example of the arrangement of rod-shaped battery modules.
Figure 3:
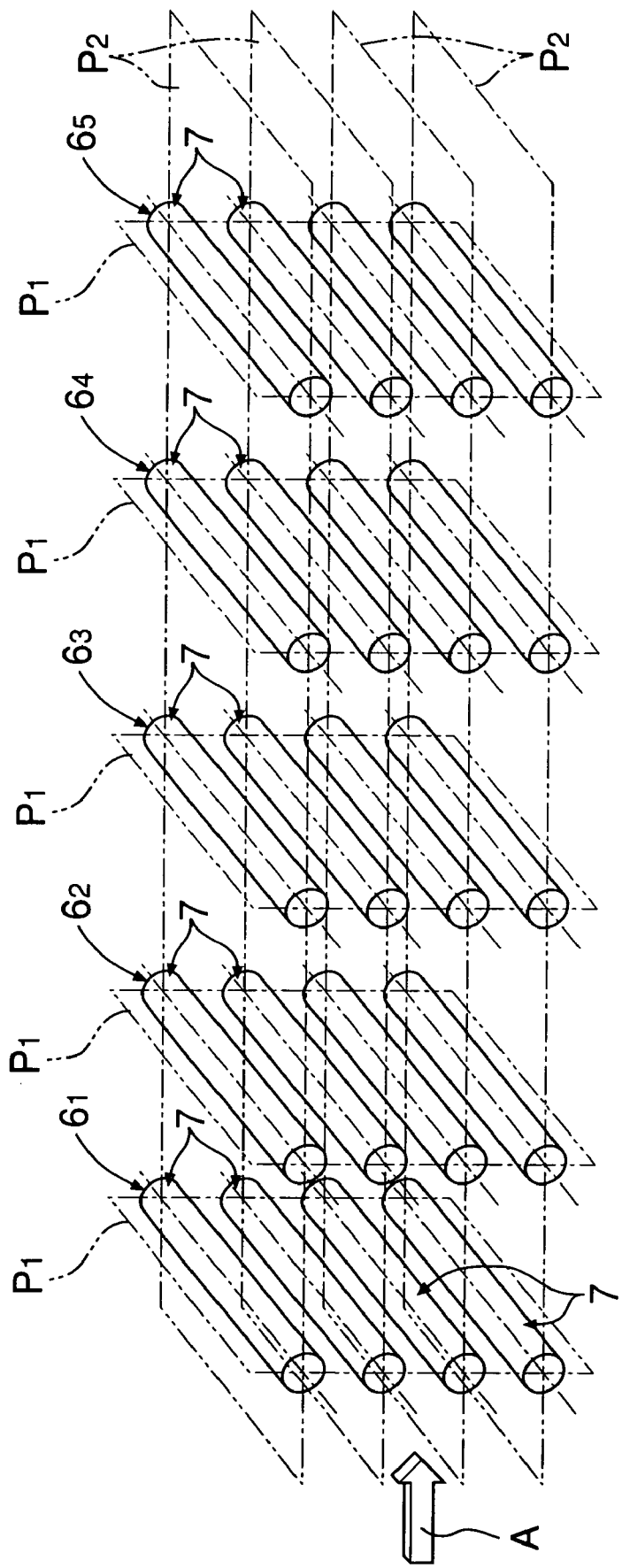
FIG. 3 is a perspective view for explaining the arrangement of the rod-shaped battery modules.

In FIGS. 1 and 2, a battery power supply system 1 includes a synthetic resin box 2, and the box 2 has a cooling air inlet 3 on one end face thereof and a suction fan 4 within a section at the other end (the box 2 can be made of metal). Within the box 2, a battery assembly 5 is housed between the cooling air inlet 3 and the suction fan 4, that is, in an intermediate section within the box 2. The battery assembly 5 includes a plurality, five in this embodiment, of battery module groups, that is, first to fifth battery module groups $6_1$ to $6_5$, which are arranged parallel to each other at intervals along a cooling air flow direction A. As shown in FIG. 3, each of the battery module groups $6_1$ to $6_5$ is formed from a plurality, four in this embodiment, of rod-shaped battery modules 7, which are arranged, within an imaginary plane $P_1$ intersecting the cooling air flow direction A, at equal intervals with the axes thereof intersecting the cooling air flow direction A. The axes of one rod-shaped battery module 7 and another rod-shaped battery module 7 that is adjacent thereto in the cooling air flow direction A are positioned within an imaginary plane $P_2$ that is parallel to the cooling air flow direction A.

Figure 4:
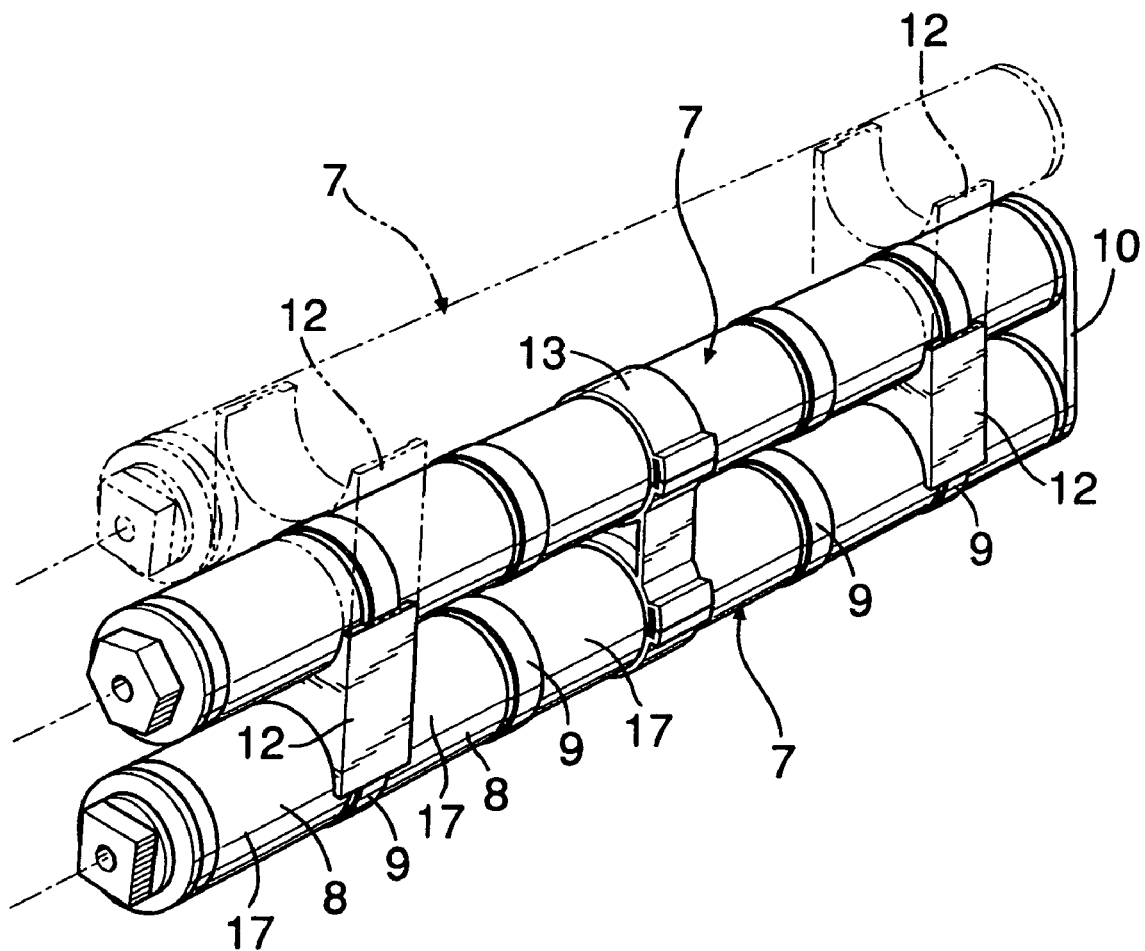
FIG. 4 is a perspective view of the rod-shaped battery modules.

As is clearly shown in FIGS. 1 and 4, each of the rod-shaped battery modules 7 includes a plurality, six in this embodiment, of batteries (secondary batteries) 8 that are linked so that adjacent batteries 8 are connected in series via a connecting ring 9. Ends of the upper two rod-shaped battery modules 7 and ends of the lower two rod-shaped battery modules 7 are each connected in series via a connecting plate 10. The other ends of the rod-shaped battery modules 7 are linked via a plurality of bus-bar plates (not illustrated) so that all of the rod-shaped battery modules 7 are connected in series, and these bus-bar plates are covered by a cover plate 11. Interposed between two vertically adjacent rod-shaped battery modules 7 are two synthetic resin grommets 12. The upper two rod-shaped battery modules 7 and the lower two rod-shaped battery modules 7 are each linked by a synthetic resin clip 13. The battery assembly 5 is mounted between a steel base plate BP and two steel frame members 14 standing thereon, via upper and lower synthetic resin grommets 15 and 16 that face the corresponding grommets 12.

In FIG. 2, when a gap between outer peripheral faces of two adjacent rod-shaped battery modules 7 of the first battery module group $6_1$, which is closest to the cooling air inlet 3, is a, and a gap between the outer peripheral face of the rod-shaped battery modules 7 of the first battery module group $6_1$ and the outer peripheral face of the adjacent rod-shaped battery modules 7 of the second battery module group $6_2$ is b, the ratio a/b of the gaps a and b is set so that $1.0<a/b \leq 2.0$. The outer peripheral face of the rod-shaped battery module 7 referred to here means the outer peripheral face of a cylindrical body 17 on the negative electrode side of the battery 8, and the same applies below. The outer diameter e of the cylindrical body 17 is 32 mm. Furthermore, when a gap between the outer peripheral face of the rod-shaped battery modules 7 of the second battery module group $6_2$ and the outer peripheral face of the adjacent rod-shaped battery modules 7 of the third battery module group $6_3$ is c, a gap between the outer peripheral face of the rod-shaped battery modules 7 of the third battery module group $6_3$ and the outer peripheral face of the adjacent rod-shaped battery modules 7 of the fourth battery module group $6_4$ is d, and a gap between the outer peripheral face of the rod-shaped battery modules 7 of the fourth battery module group $6_4$ and the outer peripheral face of the adjacent rod-shaped battery modules 7 of the fifth battery module group $6_5$ is d, in the example shown in FIG. 2 they are set so that a=c=d.

When the ratio a/b of the gaps a and b is set so that 1.0<a/b≦2.0 as described above, the cooling air, which has been introduced from between two adjacent rod-shaped battery modules 7 (gap a) of the first battery module group $6_1$, has its entry between the rod-shaped battery modules 7 of the first battery module group $6_1$ and the adjacent rod-shaped battery modules 7 of the second battery module group $6_2$ (gap b) suppressed, and the cooling air instead flows straight on. Although this reduces the extent of cooling of the first and second battery module groups $6_1$ and $6_2$, the cooling air, whose temperature increase has as a result been suppressed, can increase the extent of cooling of the third battery module group $6_3$ and those thereafter, thereby suppressing the overall temperature variation of the battery module groups $6_1$ to $6_5$.

As specific examples, various changes were made to the ratio a/b with the gaps a, c, and d identical to each other and the flow rate of the suction fan 4 set at 60 m³/h, and the difference in temperature between the highest temperature and the lowest temperature among all the rod-shaped battery modules 7, that is, the temperature variation ΔT, was determined. The results are given in Table 1.

Figure 6:
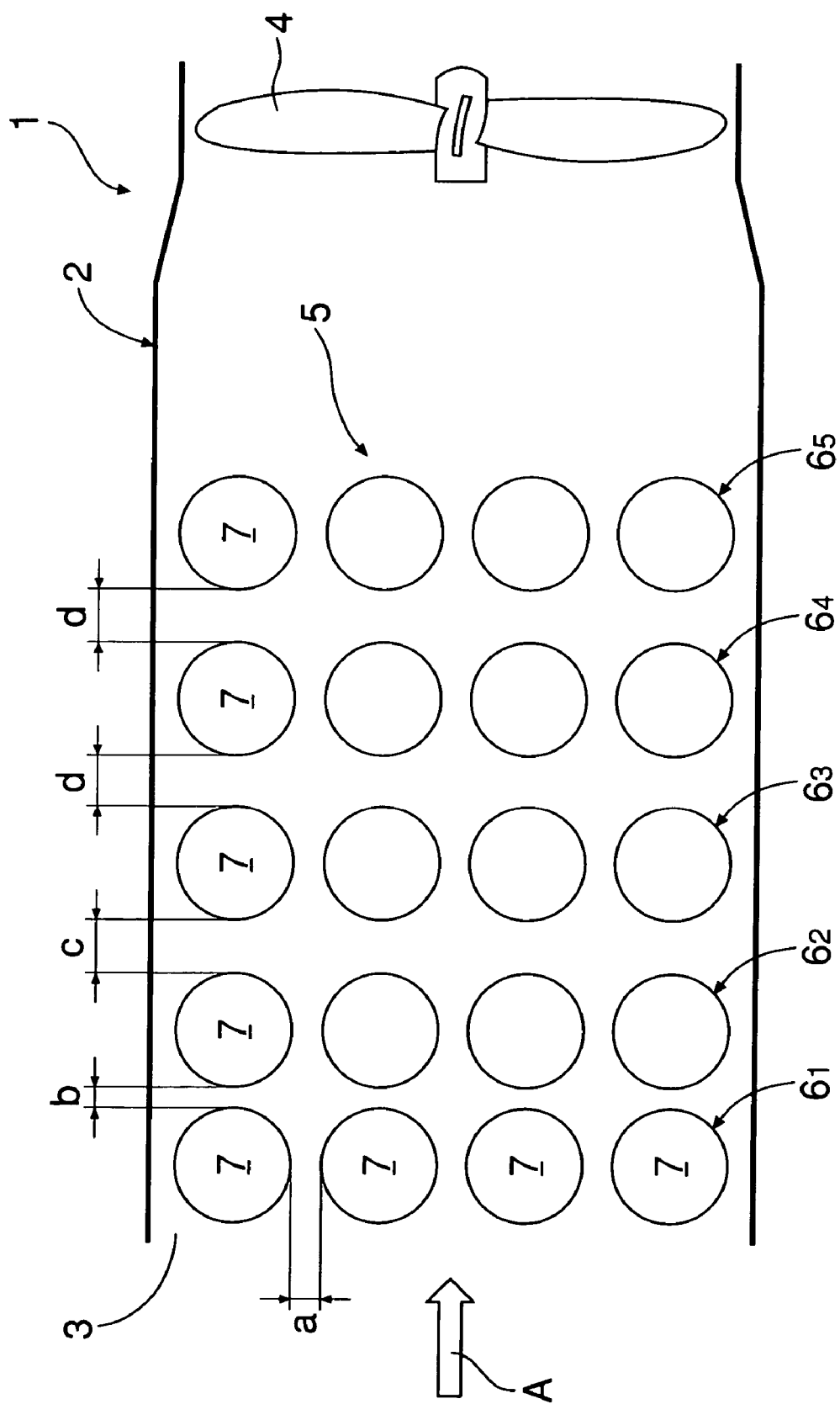
FIG. 6 corresponds to a sectional view along line 2-2 in FIG. 1 and shows a second example of the arrangement of rod-shaped battery modules.
Figure 7:
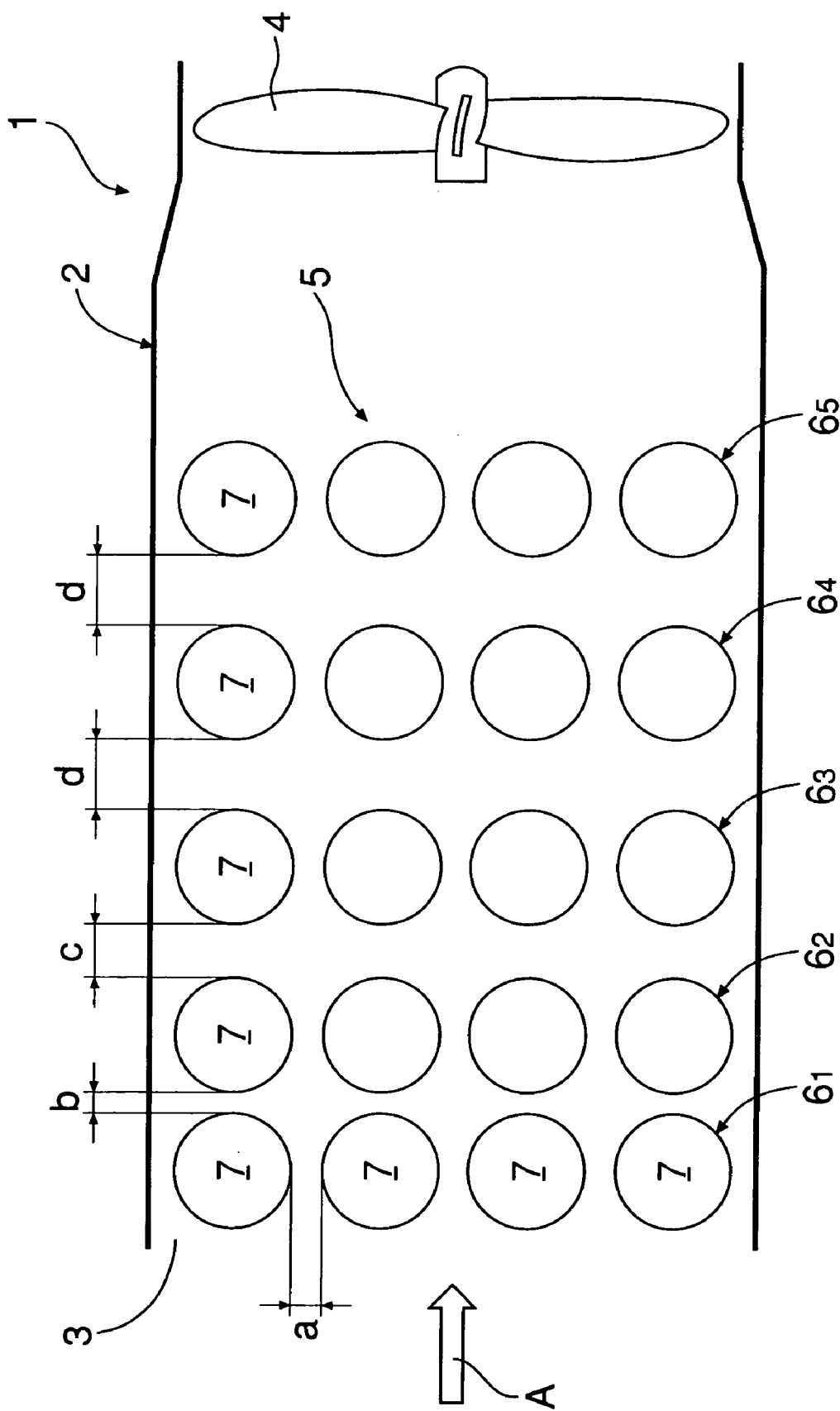
FIG. 7 corresponds to a sectional view along line 2-2 in FIG. 1 and shows a third example of the arrangement of rod-shaped battery modules.

FIG. 7 shows an arrangement in which the gap d was set at 21 mm, which was larger than the gap d in FIG. 6, and the gaps a, b, and c were the same as in FIG. 6, that is, a=10 mm, b=7 mm, and c=17 mm (b<a<c<d; 1.0<a/b≦2.0, 1.0<c/b≦2.5, and 1.0<d/c≦2.0). When the temperature variation ΔT was measured for this system in the same manner as above, ΔT=4.5° C., which turned out to be lower than the temperature variation in Example 6.

Embodiment II

Figure 8:
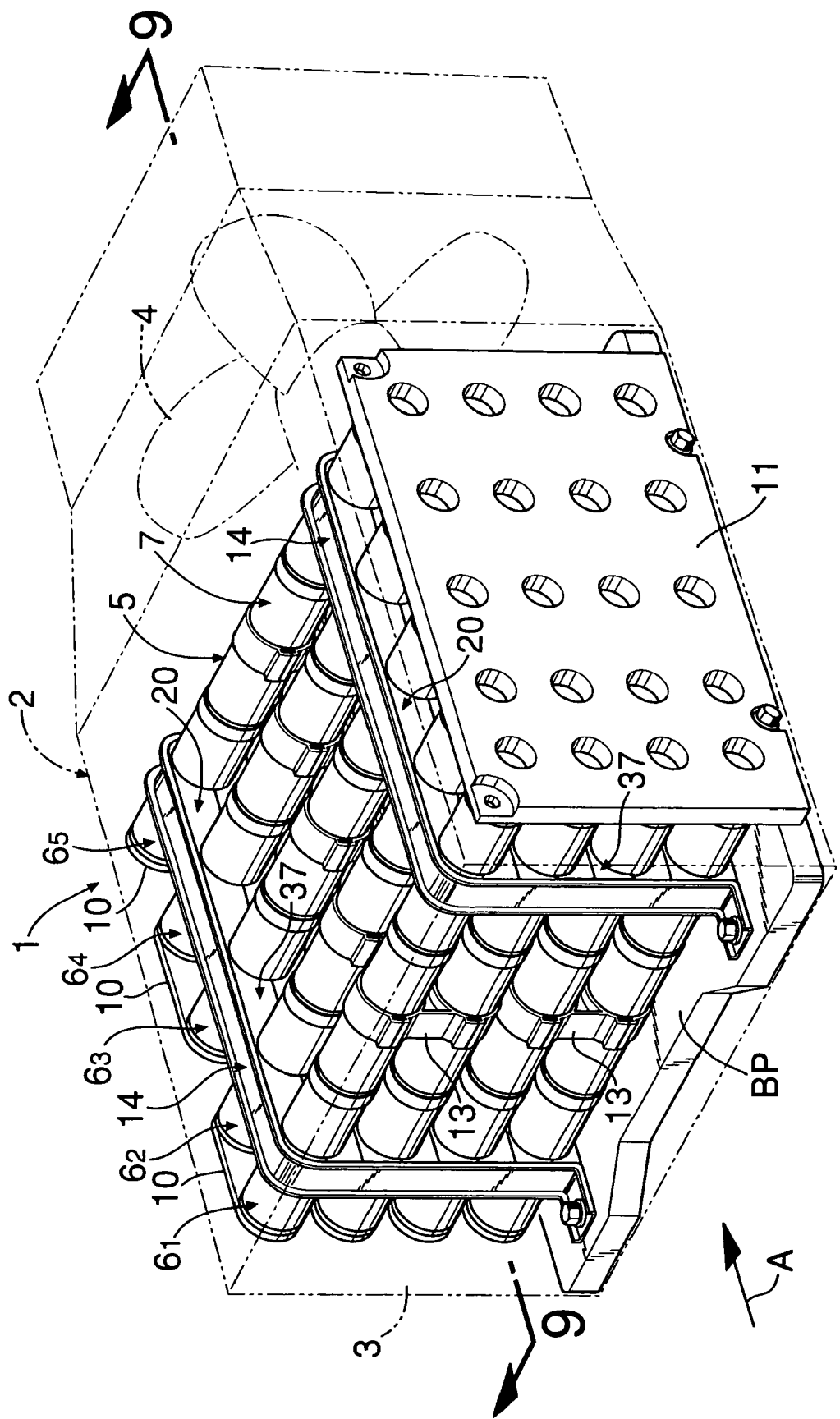
FIG. 8 is a perspective view of a battery power supply system.
Figure 9:
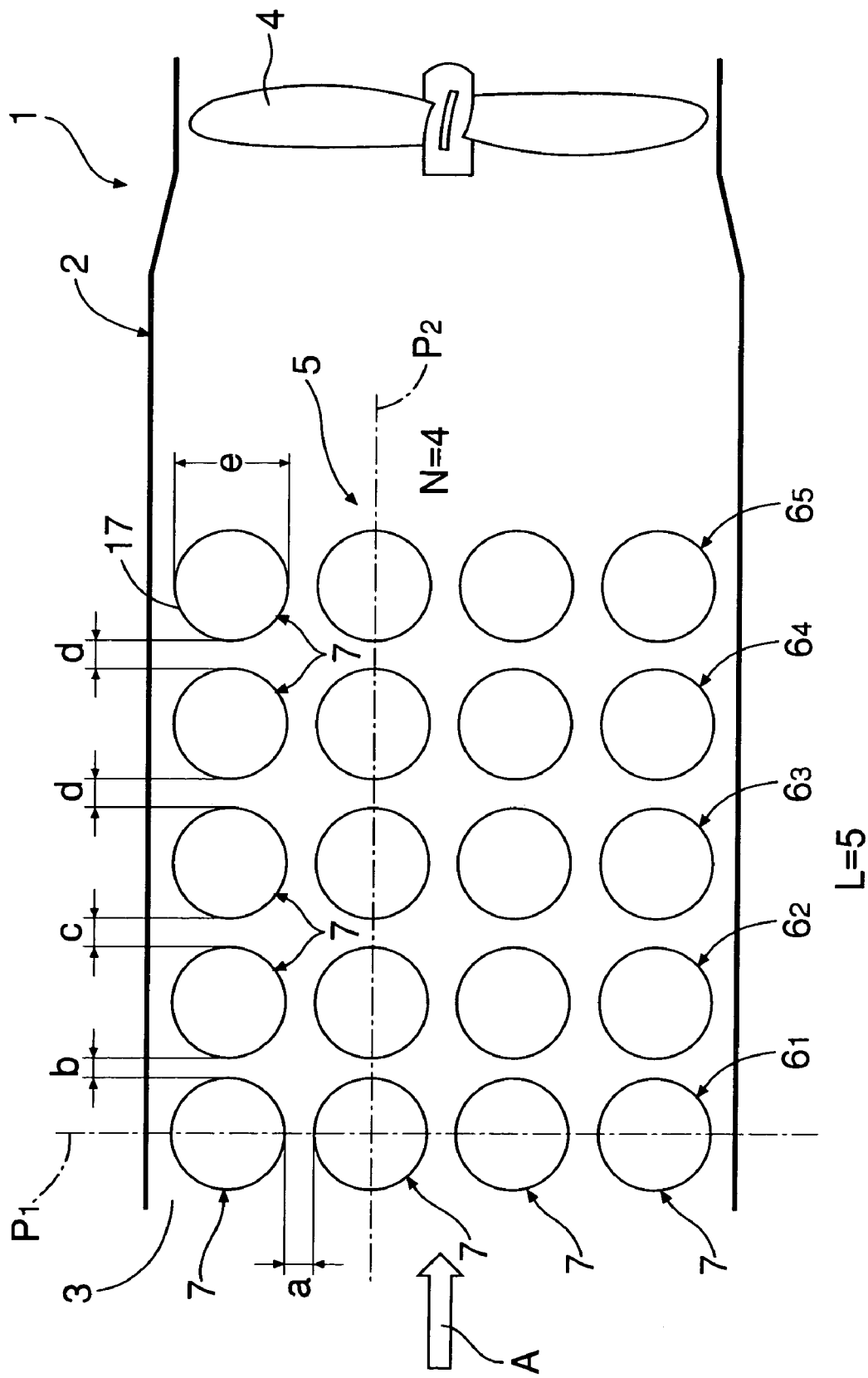
FIG. 9 corresponds to a sectional view along line 9-9 in FIG. 8 and explains the arrangement of rod-shaped battery modules.
Figure 10:
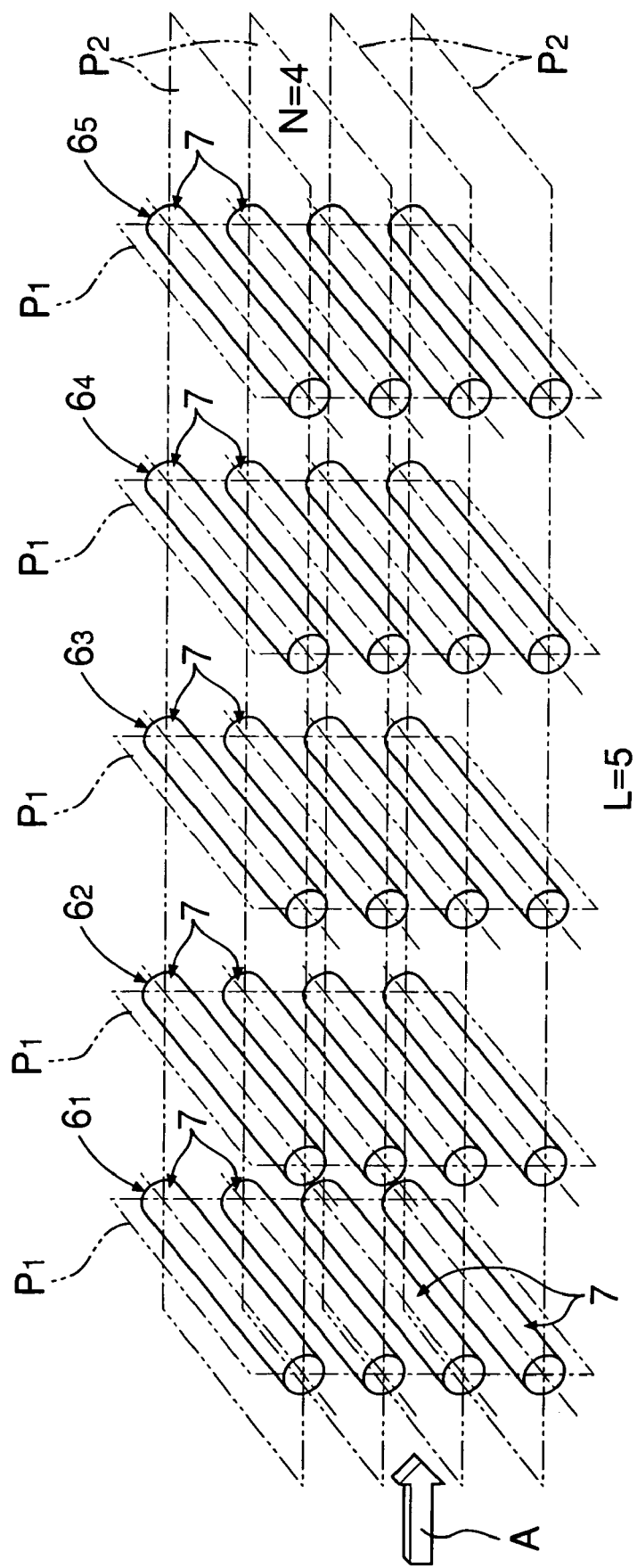
FIG. 10 is a perspective view for explaining the arrangement of rod-shaped battery modules.

In FIGS. 8 and 9, a battery power supply system 1 includes a synthetic resin box 2, and the box 2 has a cooling air inlet 3 on one end face thereof and a suction fan 4 within a section at the other end (the box 2 can be made of metal). Within the box 2, a battery assembly 5 is housed between the cooling air inlet 3 and the suction fan 4, that is, in an intermediate section within the box 2. The battery assembly 5 comprises a plurality, five in this embodiment, of battery module groups, that is, first to fifth battery module groups $6_1$ to $6_5$, which are arranged parallel to each other at intervals along a cooling air flow direction A. As shown in FIG. 10, each of the battery module groups $6_1$ to $6_5$ is formed from a plurality, four in this embodiment, of rod-shaped battery modules 7, which are arranged, within an imaginary plane $P_1$ intersecting the cooling air flow direction A, at equal intervals with the axes thereof intersecting the cooling air flow direction A. The axes of one rod-shaped battery module 7 and another rod-shaped battery module 7 that is adjacent thereto in the cooling air flow direction A are positioned within an imaginary plane $P_2$ that is parallel to the cooling air flow direction A.

Figure 11:
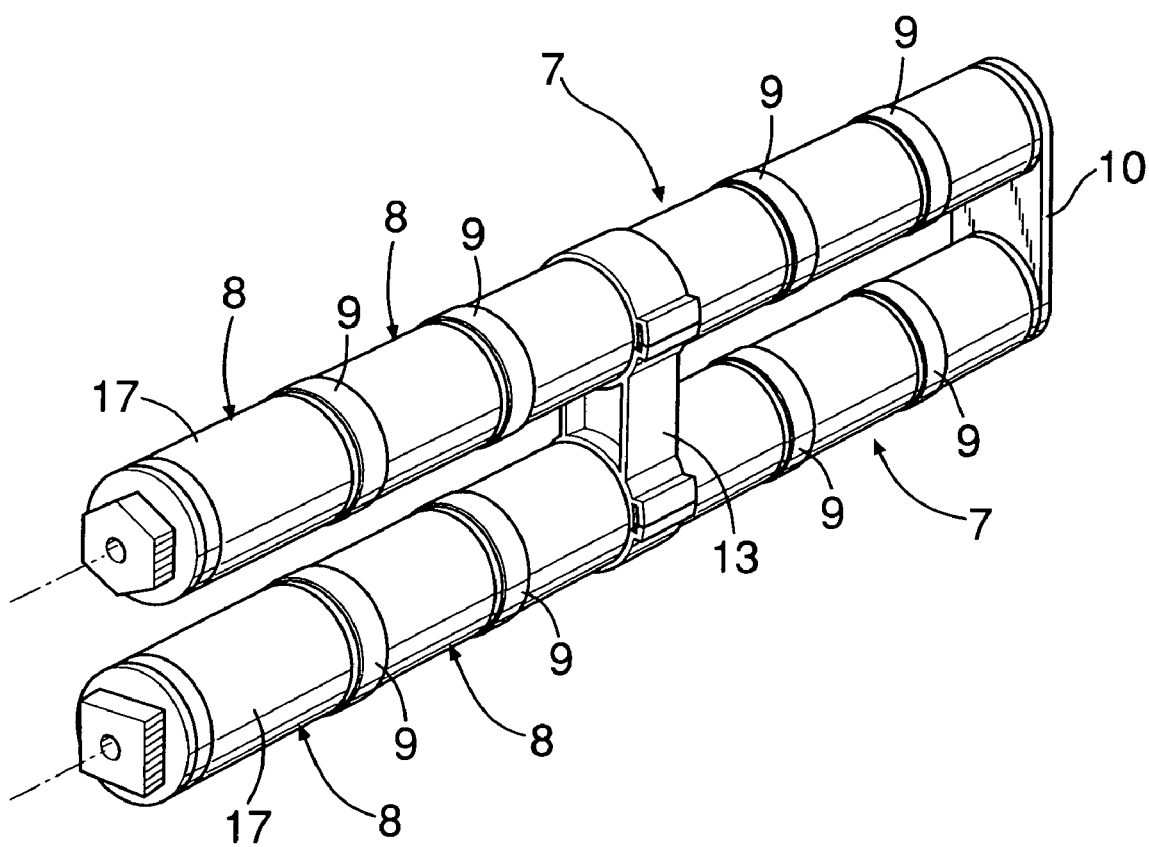
FIG. 11 is a perspective view of rod-shaped battery modules.
Figure 14:
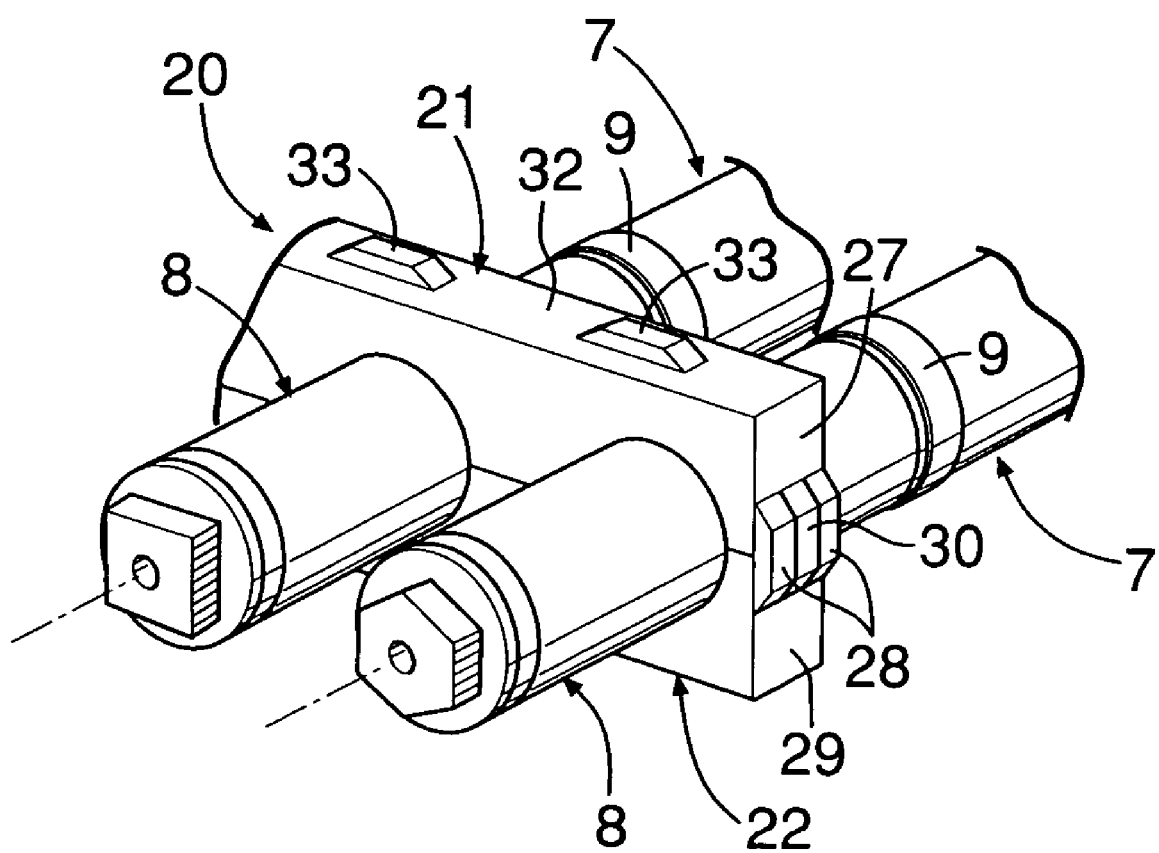
FIG. 14 is a perspective view of an essential part showing the relationship between the grommet and the rod-shaped battery modules.

As is clearly shown in FIGS. 8 and 11, each of the rod-shaped battery modules 7 includes a plurality, six in this embodiment, of batteries (secondary batteries) 8 that are linked so that adjacent batteries 8 are connected in series via a connecting ring 9.

As shown in FIGS. 8 and 12 to 14, sets of five rod-shaped battery modules 7 arranged in the cooling air flow direction

TABLE 1

| | Ex. (1) | Ex. (2) | Ex. (3) | Ex. (4) | Ex. (5) | Ex. (6) | Ex. (7) | Ex. (8) | Ex. (9) |
|---|---|---|---|---|---|---|---|---|---|
| Gap a | 8 | 8 | 8 | 10 | 10 | 10 | 12 | 12 | 12 |
| Gap b | 4 | 9 | 12 | 4 | 7 | 10 | 5 | 7 | 11 |
| Ratio a/b | 2.00 | 0.89 | 0.67 | 2.50 | 1.43 | 1.00 | 2.40 | 1.71 | 1.09 |
| Temp. variation ΔT | 5.3 | 6.3 | 8.0 | 8.1 | 4.7 | 5.4 | 7.2 | 5.0 | 5.0 |

Figure 5:
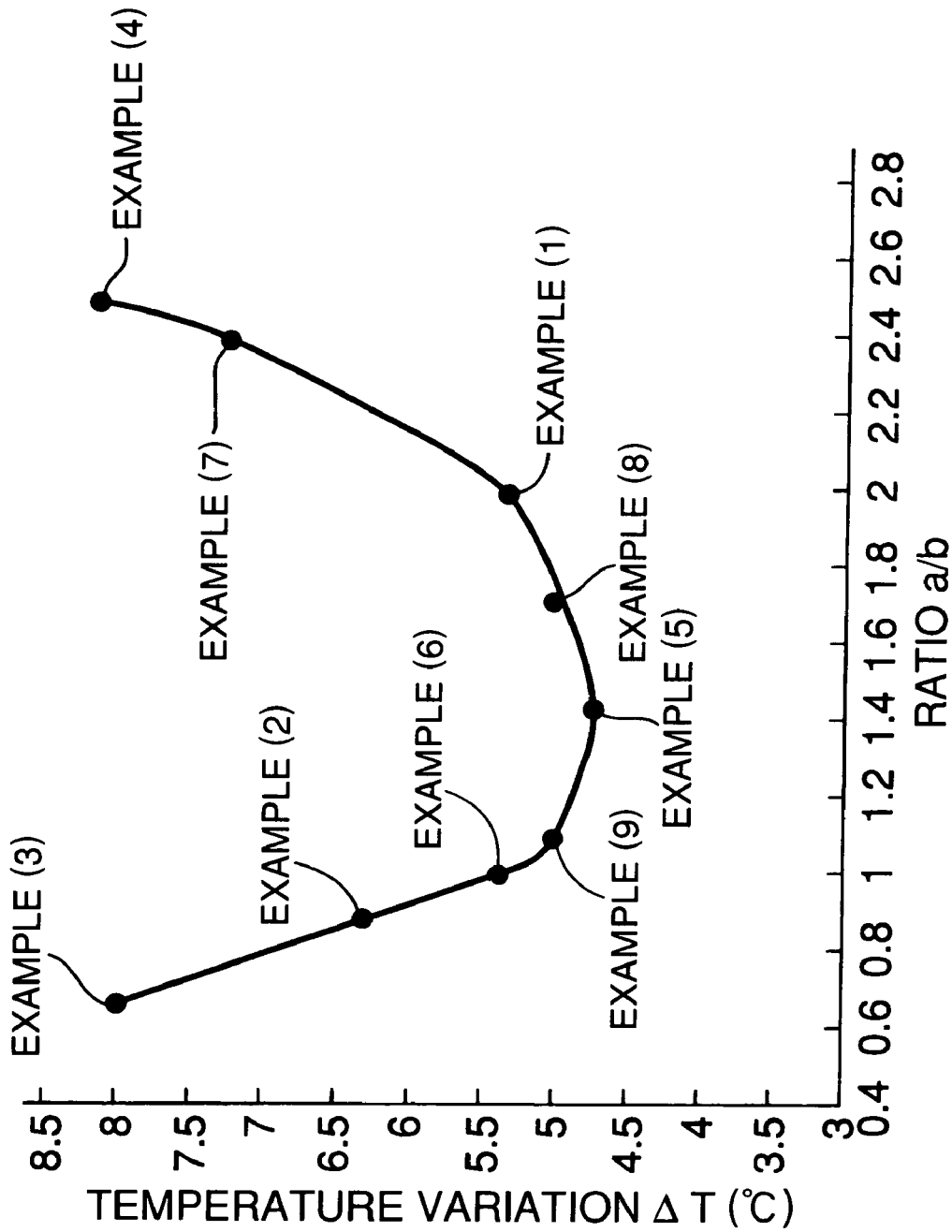
FIG. 5 is a graph showing the relationship between the ratio a/b and the temperature variation $\Delta T$.

FIG. 5 is a graph showing the relationship between the ratio a/b and the temperature variation ΔT based on Table 1. As is clear from FIG. 5, setting the ratio a/b so that 1.0<a/b≦2.0 enables the temperature variation ΔT to be ≦5.5° C. as in Examples (1), (5), (6), (8), and (9). The ratio a/b is preferably a/b≦1.8 as in Examples (5), (8), and (9), and this enables the temperature variation ΔT to be decreased to ≦5.0° C.

FIG. 6 shows an arrangement in which the two gaps c and d were set at c=d=17 mm, which is larger than the gaps c and d of Example (5), and the two gaps a and b were set to be the same as in Example (5), that is, a=10 mm and b=7 mm (b<a<c=d; 1.0<a/b≦2.0, and 1.0<c/b≦2.5). When the temperature variation ΔT was measured for this system in the same manner as above, ΔT=4.6° C., which turned out to be lower than the temperature variation in Example (5).

A are held by two synthetic resin square rod-shaped grommets 20 disposed at two positions at a predetermined interval in the axial direction.

Each grommet 20 is formed from an upper first half 21 and a lower second half 22. Formed on each of joining faces 23 and 24 of the two halves 21 and 22 are five semi arc-shaped recesses 25 and 26, which are fitted around the outer peripheral faces of the respective rod-shaped battery modules 7.

Provided on each of opposite sides 27 of the first half 21 are two projections 28 having an isosceles trapezoidal cross section and having the base thereof parallel to the vertical direction, the two projections 28 being provided at a predetermined interval and in a manner such that half of the length of the base projects from the lower edge of the first half 21. On the other hand, provided on each of opposite sides 29 of the second half 22 is one projection 30 having the same shape as that of the projections 28 of the first half 21, the projection 30 being provided so that substantially half of the length of the base thereof projects from the upper edge. Each projection 30 of the second half 22 is fitted in a channel 31 between the two projections 28 of the first half 21, thereby locating the first and second halves 21 and 22 relative to each other.

Formed on an upper face 32 of the first half 21 are a plurality of projections 33, the projections 33 corresponding to the respective recesses 25, having an isosceles trapezoidal cross section, and being disposed so that their bases are parallel to the longitudinal direction of the first half 21. On the other hand, formed on a lower face 34 of the second half 22 are a plurality of small holes 35, the small holes 35 corresponding to the respective recesses 26, having an isosceles trapezoidal cross section, and being disposed so that their bases are parallel to the longitudinal direction of the second half 22. Each projection 33 of the first half 21 of the grommet 20 on the lower side is fitted in each small hole 35 of the second half 22 of the grommet 20 that is directly thereabove, thereby locating the upper and lower sections of the grommets 20 relative to each other.

The upper two adjacent rod-shaped battery modules 7 and the lower two adjacent rod-shaped battery modules 7 are each linked via a synthetic resin clip 13 at an axially intermediate position of the rod-shaped battery modules 7.

The battery assembly 5 having two grommet stacks 37 is mounted on the upper face of a steel base plate BP, and two steel frame members 14 are made to stand on the base plate BP so as to surround the two grommet stacks 37. At least one, and in this embodiment two, leaf springs 41 are disposed between an inner face of an upper side 40 of each frame member 14 and an upper face 32 of the uppermost first half 21, and the grommet stacks 37 are urged toward the base plate BP by virtue of the resilient force of these leaf springs 31. A plurality, four in this embodiment, of rubber elastic bodies 43 provided on inner faces of opposite sides 42 of each frame member 14 are compression-bonded to the four assembled parts formed from the three projections 28, 28, and 30 of the grommet stacks 37.

In the first and second battery module groups $6_1$ and $6_2$, and the third and fourth battery module groups $6_3$ and $6_4$, ends of two of the rod-shaped battery modules 7 arranged in the cooling air flow direction A are each connected in series via a connecting plate 10. Among the four rod-shaped battery modules 7 of the fifth battery module group $6_5$ that are arranged in a direction intersecting the cooling air flow direction A, ends of the upper two adjacent rod-shaped battery modules 7 and ends of the lower two adjacent rod-shaped battery modules 7 are each connected in series via a connecting plate 10. The other ends of the rod-shaped battery modules 7 are linked via a plurality of bus-bar plates (not illustrated) so that all of the rod-shaped battery modules 7 are connected in series, and these bus-bar plates are covered by a cover plate 11.

In FIG. 9, when a gap between outer peripheral faces of two adjacent rod-shaped battery modules 7 of the first battery module group $6_1$, which is closest to the cooling air inlet 3, is a, and a gap between the outer peripheral face of the rod-shaped battery modules 7 of the first battery module group $6_1$ and the outer peripheral face of the adjacent rod-shaped battery modules 7 of the second battery module group $6_2$ is b, the gaps a and b are set so that a>b, that is, the ratio a/b is set so that a/b>1.0, and the upper limit value is set at a/b=2.0. The outer peripheral face of the rod-shaped battery module 7 referred to here means the outer peripheral face of a cylindrical body 17 on the negative electrode side of the battery 8, and the same applies below. The outer diameter e of the cylindrical body 17 is 32 mm, as above. Furthermore, when a gap between the outer peripheral face of the rod-shaped battery is modules 7 of the second battery module group $6_2$ and the outer peripheral face of the adjacent rod-shaped battery modules 7 of the third battery module group $6_3$ is c, a gap between the outer peripheral face of the rod-shaped battery modules 7 of the third battery module group $6_3$ and the outer peripheral face of the adjacent rod-shaped battery modules 7 of the fourth battery module group $6_4$ is d, and when a gap between the outer peripheral face of the rod-shaped battery modules 7 of the fourth battery module group $6_4$ and the outer peripheral face of the adjacent rod-shaped battery modules 7 of the fifth battery module group $6_5$ is d, in the example shown in FIG. 9 they are set so that a=c=d.

When the ratio a/b of the gaps a and b is set so that $1.0<a/b\leq 2.0$ as described above, the cooling air, which has been introduced from between two adjacent rod-shaped battery modules 7 (gap a) of the first battery module group $6_1$, has its entry between the rod-shaped battery modules 7 of the first battery module group $6_1$ and the adjacent rod-shaped battery modules 7 of the second battery module group $6_2$ (gap b) suppressed, and the cooling air instead flows straight on. Although this reduces the extent of cooling of the first and second battery module groups $6_1$ and $6_2$, the cooling air, whose temperature increase has as a result been suppressed, can increase the extent of cooling of the third battery module group $6_3$ and those thereafter, thereby suppressing the overall temperature variation of the battery module groups $6_1$ to $6_5$.

If the ratio a/b is $\leq 1.0$, the above-mentioned effects cannot be obtained, and on the other hand if a/b>2.0, the following problems occur. That is, when the gap a is too large, the dimensions of the battery power supply system 1 itself increase, and it is not suitable for mounting in a battery car, etc. On the other hand, when the gap b is too small, the first and second battery module groups $6_1$ and $6_2$ are too close to each other, the areas of the outer peripheral faces that are exposed to the cooling air are more limited, the extent of cooling of the outer peripheral faces thereof is decreased, and the overall temperature variation of the battery module groups $6_1$ to $6_5$ cannot be suppressed.

When the number of imaginary planes $P_1$ that intersect the cooling air flow direction A is L (in the embodiment, the same as the number of rod-shaped battery modules 7 arranged in the cooling air flow direction A), and the number of imaginary planes $P_2$ that are parallel to the cooling air flow direction A is N (in the embodiment, the same as the number of rod-shaped battery modules 7 arranged in the direction intersecting the cooling air flow direction A), the ratio L/N of L and N is set so that $0.5\leq L/N \leq 2.0$.

In accordance with this arrangement, the suppression of preferential cooling of the first and second rod-shaped battery module groups $6_1$ and $6_2$ by setting a>b can be further promoted, thereby reducing the overall temperature variation of the battery module groups $6_1$ to $6_5$. In addition, when the ratio L/N is<0.5 or >2.0, the temperature variation increases.

Various specific examples of the battery power supply system 1 and the overall temperature variation of the battery module groups $6_1$ to $6_5$ thereof are now explained. In these cases, the number of batteries 8 forming each rod-shaped battery module 7 is 6 as described above, the outer diameter of the battery 8, that is, the outer diameter e of a cylindrical body 17 on the negative electrode side, is set at e=32 mm, and the gaps a to d are set at a=10 mm, b=6 mm, and a=c=d.

Table 2 shows the relationship between the values of L and N and the ratio L/N.

TABLE 2

| N | L | | | | | | | | | |
|---|---|---|---|---|---|---|---|---|---|---|
|   | 1 | 2 | 3 | 4 | 5 | 6 | 7 | 8 | 9 | 10 |
| 1 | 1.000 | 2.000 | 3.000 | 4.000 | 5.000 | 6.000 | 7.000 | 8.000 | 9.000 | 10.000 |
| 2 | 0.500 | 1.000 | 1.500 | 2.000 | 2.500 | 3.000 | 3.500 | 4.000 | 4.500 | 5.000 |
| 3 | 0.333 | 0.667 | 1.000 | 1.333 | 1.667 | 2.000 | 2.333 | 2.667 | 3.000 | 3.333 |
| 4 | 0.250 | 0.500 | 0.750 | 1.000 | 1.250 | 1.500 | 1.750 | 2.000 | 2.250 | 2.500 |
| 5 | 0.200 | 0.400 | 0.600 | 0.800 | 1.000 | 1.200 | 1.400 | 1.600 | 1.800 | 2.000 |
| 6 | 0.167 | 0.333 | 0.500 | 0.667 | 0.833 | 1.000 | 1.167 | 1.333 | 1.500 | 1.667 |
| 7 | 0.143 | 0.286 | 0.429 | 0.571 | 0.714 | 0.857 | 1.000 | 1.143 | 1.286 | 1.429 |
| 8 | 0.125 | 0.250 | 0.375 | 0.500 | 0.625 | 0.750 | 0.875 | 1.000 | 1.125 | 1.250 |

Ratio L/N

Figure 15:
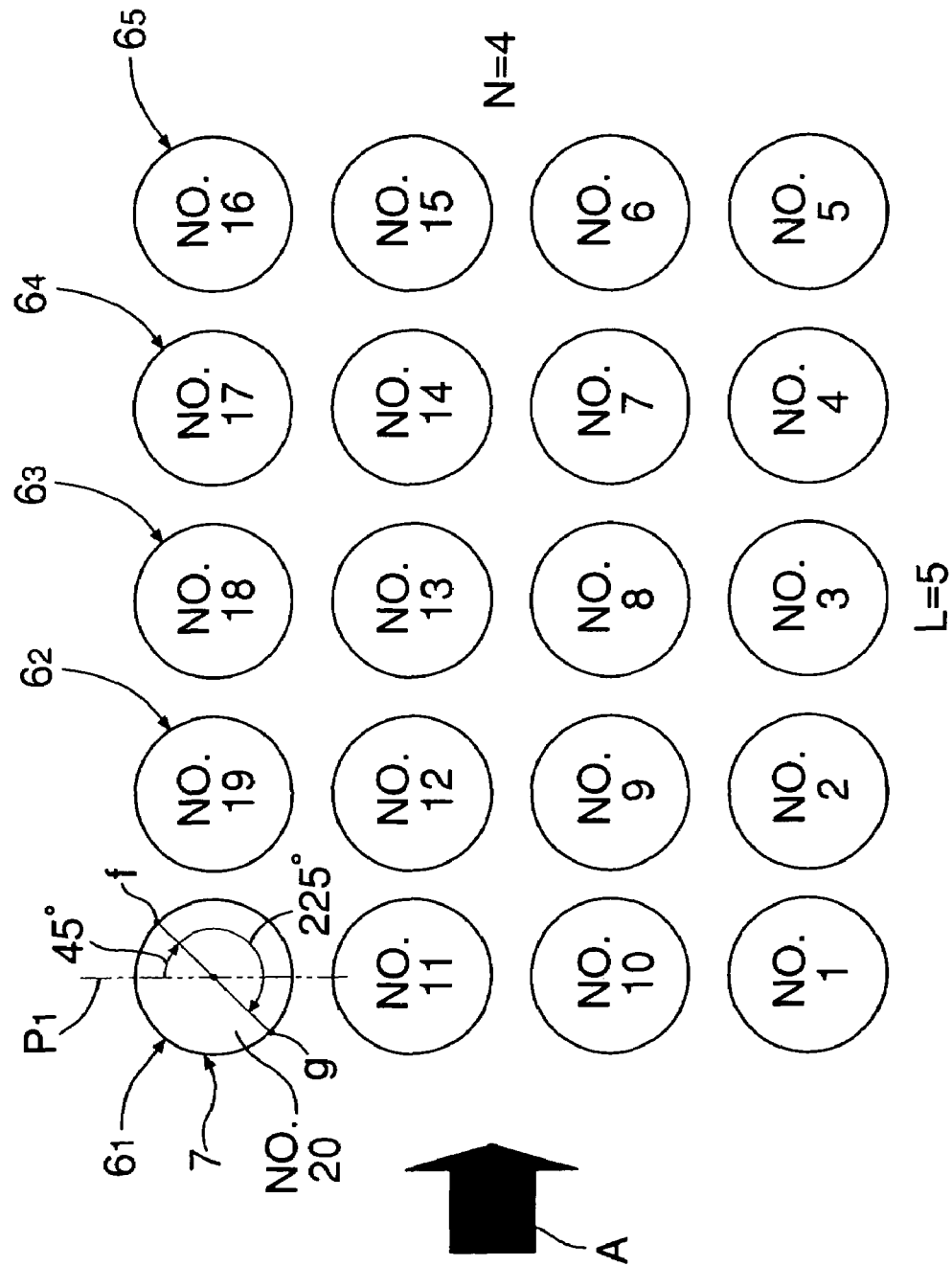
FIG. 15 is a diagram for explaining one arrangement of the rod-shaped battery modules.

As shown in the embodiment above, that is, in FIG. 15, with regard to the battery power supply system 1 in which N=4, L=5, the ratio L/N=1.250, and the numbers of the rod-shaped battery modules 7 are represented as Nos. 1 to 20, the overall temperature variation of the first to fifth battery module groups $6_1$ to $6_5$ was investigated under the following conditions: cooling air temperature: 35° C. ; temperature within the power supply system: 35° C.±2° C. cooling air flow rate: 0.05 m³/min per rod-shaped battery module.

The temperature of each rod-shaped battery module 7 was determined by the following method. That is, the temperature of each one of the six batteries 8 forming the rod-shaped battery module 7 was measured at two points, and the average value of these two measurements was defined as the temperature of said one battery 8, and the temperature measurements of the six batteries 8 thus obtained were averaged and this average value was defined as the temperature of the rod-shaped battery module 7. The two temperature measurement positions of the battery 8 are, as clearly shown in FIG. 15, at a position f that is 45° and a position g that is 225° clockwise around the rod-shaped battery module 7, that is, the axis of the batteries 8, from the imaginary plane P1, which intersects the cooling air flow direction A, and these positions are on the outer peripheral face of the cylindrical body 17 on the negative electrode side.

Table 3 shows the measured temperature of each rod-shaped battery module 7, the average temperature measurement obtained therefrom, and the overall percentage temperature variation of the first to fifth battery module groups $6_1$ to $6_5$.

TABLE 3

| No. of rod-shaped battery module | Measured temperature (° C.) | Average measured temperature Tc (° C.) | Percentage temperature variation U (%) |
|---|---|---|---|
| 1 | 43.9 | 45.495 | 8.35 |
| 2 | 44.5 |  | [L/N = 1.250] |
| 3 | 45.3 |  |  |
| 4 | 46.6 |  |  |
| 5 | 46.1 |  |  |
| 6 | 46.6 |  |  |
| 7 | 47.4 |  |  |
| 8 | 45.2 |  |  |
| 9 | 44.4 |  |  |
| 10 | 43.8 (Tb) |  |  |
| 11 | 43.9 |  |  |
| 12 | 44.5 |  |  |
| 13 | 45.4 |  |  |
| 14 | 47.4 |  |  |
| 15 | 47.1 |  |  |
| 16 | 47.6 (Ta) |  |  |
| 17 | 46.8 |  |  |
| 18 | 44.9 |  |  |
| 19 | 44.7 |  |  |
| 20 | 43.8 (Tb) |  |  |

The percentage temperature variation U was determined from:

$$U=[\{(Ta-Tc)=(Tc-Tb)\}/Tc]\times 100\ (\%)$$

where Ta is the maximum temperature measured for the rod-shaped battery module 7 (47.6° C. for No. 16), Tb is the minimum temperature measured (43.8° C. for Nos. 10 and 20), and Tc is the average temperature measured (45.495° C.). Therefore, the smaller the percentage temperature variation, the smaller the overall temperature variation of the first to fifth battery module groups $6_1$ to $6_5$.

Figure 16:
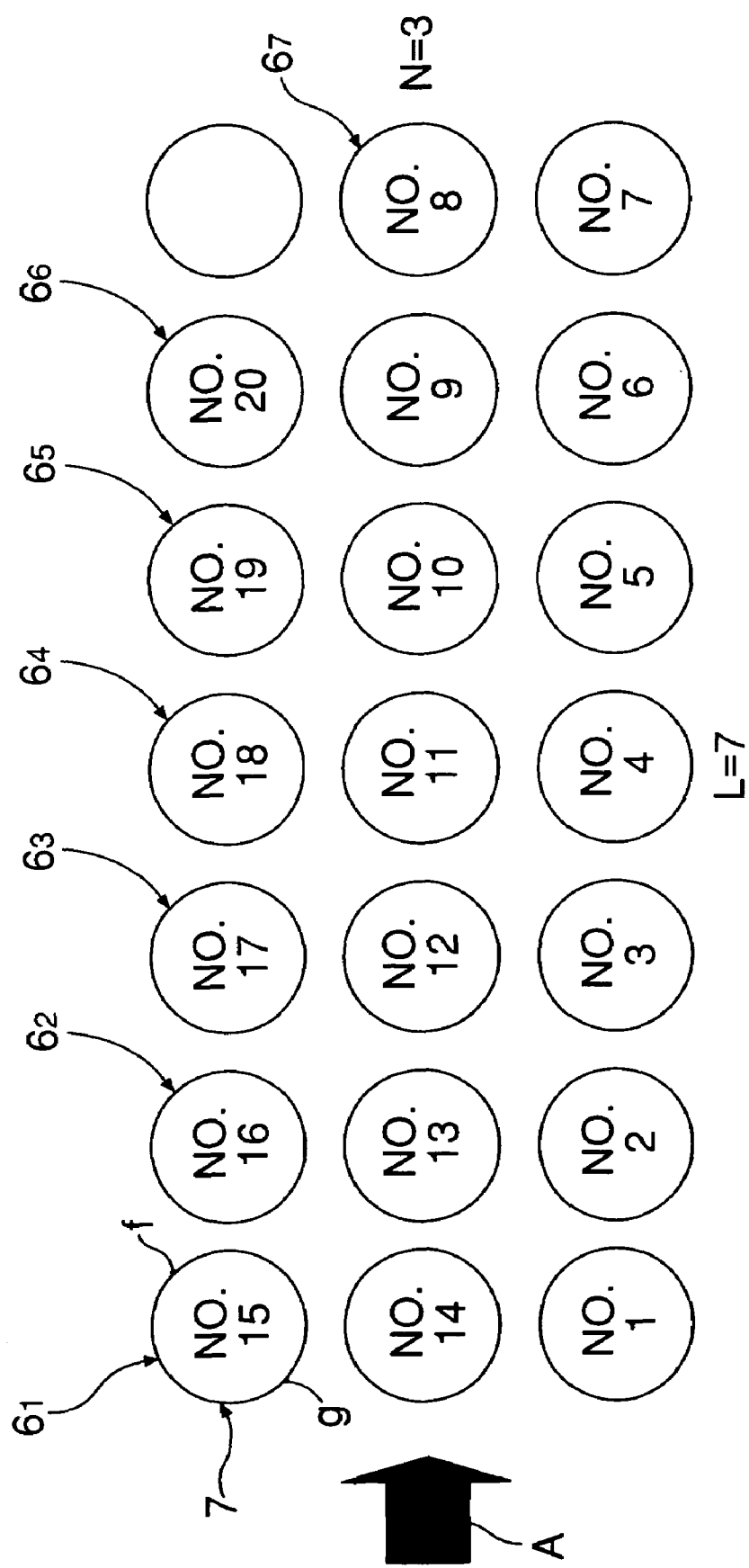
FIG. 16 is a diagram for explaining another arrangement of the rod-shaped battery modules.

As another example, as shown in FIG. 16, with regard to a battery power supply system 1 in which N=3, L=7, the ratio L/N=2.333, and the numbers of the rod-shaped battery modules 7 are represented as Nos. 1 to 20, the overall temperature variation of first to seventh battery module groups $6_1$ to $6_7$ was investigated by the same method and under the same conditions as above. The results are given in Table 4.

TABLE 4

| No. of rod-shaped battery module | Measured temperature (° C.) | Average measured temperature Tc (° C.) | Percentage temperature variation U (%) |
|---|---|---|---|
| 1 | 44.3 | 45.310 | 11.04 |
| 2 | 46.4 |  | [L/N = 2.333] |
| 3 | 48.4 (Ta) |  |  |
| 4 | 44.3 |  |  |
| 5 | 44.1 |  |  |
| 6 | 45.0 |  |  |
| 7 | 45.9 |  |  |
| 8 | 45.3 |  |  |
| 9 | 44.3 |  |  |
| 10 | 43.6 |  |  |
| 11 | 43.5 |  |  |
| 12 | 46.5 |  |  |
| 13 | 48.3 |  |  |
| 14 | 44.3 |  |  |

TABLE 4-continued

| No. of rod-shaped battery module | Measured temperature (° C.) | Average measured temperature Tc (° C.) | Percentage temperature variation U (%) |
|---|---|---|---|
| 15 | 45.4 | | |
| 16 | 48.4 (Ta) | | |
| 17 | 46.3 | | |
| 18 | 43.4 (Tb) | | |
| 19 | 44.1 | | |
| 20 | 44.4 | | |

In FIG. 16, the reason why the number of rod-shaped battery modules 7 of the seventh battery module group 6$_7$ is one less than that of the others is because the rod-shaped battery modules 7 are connected in groups of two, and the number of rod-shaped battery modules 7 should therefore be even.

The overall temperature variation of the battery module groups was then investigated by the same method and under the same conditions as above by variously changing the values N and L and the number of rod-shaped battery modules 7. Table 5 shows the values of N and L, the number of rod-shaped battery modules 7, the ratio L/N, and the percentage temperature variation U for each example.

TABLE 5

| Ex. | N | L | Number of rod-shaped battery modules | L/N | Percentage temperature variation U (%) |
|---|---|---|---|---|---|
| 1 | 7 | 2 | 14 | 0.286 | 11.51 |
| 2 | 8 | 3 | 24 | 0.375 | 10.91 |
| 3 | 5 | 2 | 10 | 0.400 | 10.30 |
| 4 | 7 | 3 | 20 (−1) | 0.429 | 10.10 |
| 5 | 4 | 2 | 8 | 0.500 | 9.30 |
| 6 | 5 | 3 | 14 (−1) | 0.600 | 8.74 |
| 7 | 4 | 3 | 12 | 0.750 | 8.55 |
| 8 | 7 | 6 | 42 | 0.857 | 8.36 |
| 9 | 5 | 5 | 24 (−1) | 1.000 | 8.36 |
| 10 | 4 | 5 | 20 | 1.250 | 8.35 |
| 11 | 4 | 6 | 24 | 1.500 | 8.36 |
| 12 | 4 | 7 | 28 | 1.750 | 8.55 |
| 13 | 3 | 6 | 18 | 2.000 | 9.40 |
| 14 | 4 | 9 | 36 | 2.250 | 10.60 |
| 15 | 3 | 7 | 20 (−1) | 2.333 | 11.04 |
| 16 | 2 | 5 | 10 | 2.500 | 11.23 |
| 17 | 3 | 8 | 24 | 2.667 | 11.88 |
| 18 | 3 | 9 | 26 (−1) | 3.000 | 12.10 |
| 19 | 2 | 7 | 14 | 3.500 | 12.53 |
| 20 | 2 | 8 | 16 | 4.000 | 12.96 |

In Table 5, in the column showing the number of rod-shaped battery modules, (−1) denotes that the number of rod-shaped battery modules of the battery module group that is farthest from the cooling air inlet 3 is one less than that of the others as in the above-mentioned comparative example. Example 10 corresponds to the embodiment above, and Example 15 corresponds to the other example.

FIG. 17 is a graph showing the relationship between the ratio L/N and the percentage temperature variation U based on Table 5.

It can be seen from FIG. 17 that setting the ratio L/N at $0.5 \leq L/N \leq 2.0$ decreases the percentage temperature variation U to $\leq 9.40\%$, and setting the ratio L/N at $0.5 < L/N < 2.0$ decreases the percentage temperature variation U to $\leq 8.74\%$.

The invention claimed is:

1. A battery power supply system comprising: a box having a cooling air inlet on one end face and a suction fan for guiding cooling air flow from the cooling air inlet toward the other end of the box; and a battery assembly installed in an intermediate section within the box, the battery assembly comprising a plurality of battery module groups arranged at intervals in parallel to each other along a cooling air flow direction, each of the battery module groups comprising a plurality of rod-shaped battery modules arranged, within a first imaginary plane intersecting the cooling air flow direction, at equal intervals with the axes thereof intersecting the cooling air flow direction, and one rod-shaped battery module and another rod-shaped battery module that is adjacent thereto in the cooling air flow direction having their axes positioned within a second Imaginary plane that is parallel to the cooling air flow direction; wherein when a gap between outer peripheral faces of two adjacent rod-shaped battery modules of the first battery module group, which is closest to the cooling air inlet, is a, and a gap between the outer peripheral face of the rod-shaped battery modules of the first battery module group and the outer peripheral face of the adjacent rod-shaped battery modules of the second battery module group is b, the ratio a/b of the gaps a and b is set so that $1.0 < a/b \leq 2.0$.

2. The battery power supply system according to claim 1, wherein when a gap between the outer peripheral face of the rod-shaped battery modules of the second battery module group and the outer peripheral face of the adjacent rod-shaped battery modules of the third battery module group is c, the ratio c/b of gap c to gap b is set so that $1.0 < c/b \leq 2.5$.

3. The battery power supply system according to claim 2, wherein when a gap between the outer peripheral face of the rod-shaped battery modules of the third battery module group and the outer peripheral face of the adjacent rod-shaped battery modules of the fourth battery module group is d, the ratio d/c of gap d to gap c is set so that $1.0 < d/c \leq 2.0$.

4. The battery power supply system according to any one of claim 1, 2, and 3, wherein the ratio a/b is set so that $a/b \leq 1.8$.

5. A battery power supply system comprising: a box having a cooling air inlet on one end face and a suction fan for guiding cooling air flow from the cooling air inlet toward the other end of the box; and a battery assembly installed in an intermediate section within the box, the battery assembly comprising a plurality of battery module groups arranged at intervals in parallel to each other along a cooling air flow direction, each of the battery module groups comprising a plurality of rod-shaped battery modules arranged, within a first imaginary plane intersecting the cooling air flow direction, at equal intervals with the axes thereof intersecting the cooling air flow direction, one rod-shaped battery module and another rod-shaped battery module that is adjacent thereto in the cooling air flow direction having their axes positioned within a second imaginary plane that is parallel to the cooling air flow direction, and when a gap between outer peripheral faces of two adjacent rod-shaped battery modules of the first battery module group, which is closest to the cooling air inlet, is a, and a gap between the outer peripheral face of the rod-shaped battery modules of the first battery module group and the outer peripheral face of the adjacent rod-shaped battery modules of the second battery module group is b, the gaps a and b being set so that a>b;

wherein when the number of the first imaginary planes that intersect the cooling air flow direction (A) is L, and the number of the second imaginary planes that are parallel to the cooling air flow direction is N, the ratio L/N of L to N is such that $0.5 \leq L/N \leq 2.0$.

6. A battery power supply system comprising: a box having a cooling air inlet on one end face and a suction fan for guiding cooling air flow from the cooling air inlet toward the other end of the box; and a battery assembly installed in an intermediate section within the box, the battery assembly comprising a plurality of battery module groups arranged at intervals in parallel to each other along a cooling air flow direction, each of the battery module groups comprising a plurality of rod-shaped battery modules arranged, within a first imaginary plane intersecting the cooling air flow direction, at equal intervals with the axes thereof intersecting the cooling air flow direction, one rod-shaped battery module and another rod-shaped battery module that is adjacent thereto in the cooling air flow direction having their axes positioned within a second imaginary plane that is parallel to the cooling air flow direction, and when a gap between outer peripheral faces of two adjacent rod-shaped battery modules of the first battery module group which is closest to the cooling air inlet, is a, and a gap between the outer peripheral face of the rod-shaped battery modules of the first battery module group and the outer peripheral face of the adjacent rod-shaped battery modules of the second battery module group is b, the gaps a and b being set so that a>b;

wherein when the number of the first imaginary planes that intersect the cooling air flow direction is L, and the number of the second imaginary planes that are parallel to the cooling air flow direction is N, the ratio L/N of L to N is such that $0.5 < L/N < 2.0$.

* * * * *